United States Patent
Gupta

(10) Patent No.: US 12,335,287 B2
(45) Date of Patent: Jun. 17, 2025

(54) AUTOMATED DETECTION OF CROSS SITE SCRIPTING ATTACKS

(71) Applicant: Virsec Systems, Inc., San Jose, CA (US)

(72) Inventor: Satya V. Gupta, Dublin, CA (US)

(73) Assignee: Virsec Systems, Inc., San Jose, CA (US)

( * ) Notice: Subject to any disclaimer, the term of this patent is extended or adjusted under 35 U.S.C. 154(b) by 550 days.

(21) Appl. No.: 17/646,611

(22) Filed: Dec. 30, 2021

(65) Prior Publication Data

US 2022/0210180 A1 Jun. 30, 2022

Related U.S. Application Data

(60) Provisional application No. 63/133,173, filed on Dec. 31, 2020.

(51) Int. Cl.
*H04L 9/40* (2022.01)
(52) U.S. Cl.
CPC ...... *H04L 63/1433* (2013.01); *H04L 63/1416* (2013.01); *H04L 2463/146* (2013.01)
(58) Field of Classification Search
CPC ............. H04L 63/1433; H04L 63/1416; H04L 2463/146; H04L 67/02; H04L 63/168; G06F 2221/034; G06F 21/577
See application file for complete search history.

(56) References Cited

U.S. PATENT DOCUMENTS

| | | |
|---|---|---|
| 6,321,334 B1 | 11/2001 | Jerger et al. |
| 8,347,267 B2 | 1/2013 | Givoni et al. |
| 9,246,935 B2 | 1/2016 | Lietz et al. |
| 9,374,390 B1 | 6/2016 | Teal et al. |
| 9,418,230 B2 | 8/2016 | Archer et al. |
| 9,501,650 B2 | 11/2016 | Chess et al. |
| 9,578,060 B1 | 2/2017 | Brisebois et al. |

(Continued)

FOREIGN PATENT DOCUMENTS

| | | |
|---|---|---|
| WO | 2015/007166 A1 | 1/2015 |
| WO | 2016/130372 A1 | 8/2016 |

(Continued)

OTHER PUBLICATIONS

"ATT&CK (Registered)", The Mitre, Available online at: < https://attack.mitre.org>, Sep. 14, 2023, 1 page.

(Continued)

*Primary Examiner* — Huan V Doan
(74) *Attorney, Agent, or Firm* — Hamilton, Brook, Smith & Reynolds, P.C.

(57) ABSTRACT

Embodiments detect cross site scripting attacks. An embodiment captures a web request and captures a response to the captured web request. In turn, it is determined if one or more elements associated with the captured web request and one or more elements of the captured response, in combination, cause a malicious action. A cross site scripting attack is then declared in response to determining the one or more elements associated with the captured web request and the one or more elements of the captured response, in combination, (Continued)

cause a malicious action. Embodiments can take one or more protection actions in response to declaring a cross site scripting attack.

19 Claims, 5 Drawing Sheets

(56) References Cited

U.S. PATENT DOCUMENTS

| | | | |
|---|---|---|---|
| 9,589,560 B1 | 3/2017 | Vitaladevuni et al. | |
| 10,116,681 B2 | 10/2018 | Cornell et al. | |
| 10,354,074 B2 | 7/2019 | Gupta | |
| 10,387,659 B1 | 8/2019 | Youngberg et al. | |
| 10,395,041 B1 | 8/2019 | Youngberg et al. | |
| 10,447,730 B2 | 10/2019 | Gupta | |
| 10,467,419 B1 | 11/2019 | Youngberg et al. | |
| 10,963,565 B1 | 3/2021 | Xu et al. | |
| 11,615,061 B1 | 3/2023 | Malik et al. | |
| 11,907,378 B2 | 2/2024 | Gupta | |
| 12,158,958 B2 | 12/2024 | Gupta et al. | |
| 2003/0074207 A1 | 4/2003 | Pace et al. | |
| 2004/0046785 A1 | 3/2004 | Keller | |
| 2005/0102534 A1 | 5/2005 | Wong | |
| 2007/0199000 A1 | 8/2007 | Shekhel et al. | |
| 2008/0052527 A1* | 2/2008 | Siedlarz | G06F 21/6254 713/186 |
| 2009/0119769 A1* | 5/2009 | Ross | G06F 21/56 726/13 |
| 2013/0111595 A1* | 5/2013 | Amit | G06F 21/566 726/25 |
| 2014/0082735 A1 | 3/2014 | Beskrovny et al. | |
| 2014/0082739 A1 | 3/2014 | Chess et al. | |
| 2014/0165192 A1* | 6/2014 | Zhu | H04L 63/1466 726/22 |
| 2015/0215332 A1 | 7/2015 | Curcic et al. | |
| 2015/0261653 A1 | 9/2015 | Lachambre et al. | |
| 2015/0309813 A1 | 10/2015 | Patel | |
| 2016/0164891 A1 | 6/2016 | Satish et al. | |
| 2016/0241582 A1 | 8/2016 | Boia et al. | |
| 2017/0270303 A1 | 9/2017 | Roichman et al. | |
| 2017/0288878 A1 | 10/2017 | Lee et al. | |
| 2017/0353434 A1* | 12/2017 | Al-Saber | H04L 63/168 |
| 2018/0349602 A1 | 12/2018 | Johns | |
| 2019/0138725 A1 | 5/2019 | Gupta | |
| 2019/0286833 A1 | 9/2019 | Takumi et al. | |
| 2019/0377877 A1* | 12/2019 | Johns | H04L 63/1441 |
| 2020/0004963 A1 | 1/2020 | Zheng et al. | |
| 2020/0042714 A1 | 2/2020 | Gupta | |
| 2020/0065166 A1 | 2/2020 | Myneni et al. | |
| 2020/0097662 A1 | 3/2020 | Hufsmith et al. | |
| 2020/0134193 A1 | 4/2020 | Youngberg et al. | |
| 2020/0134194 A1 | 4/2020 | Youngberg et al. | |
| 2020/0134195 A1 | 4/2020 | Youngberg et al. | |
| 2020/0167477 A1 | 5/2020 | Ionescu et al. | |
| 2020/0336507 A1 | 10/2020 | Lee et al. | |
| 2021/0086089 A1 | 3/2021 | Pardeshi et al. | |
| 2021/0099483 A1 | 4/2021 | Shukla | |
| 2021/0160273 A1 | 5/2021 | Choi et al. | |
| 2022/0046031 A1* | 2/2022 | Kaidi | H04L 63/1433 |
| 2022/0067174 A1 | 3/2022 | Gupta | |
| 2022/0147635 A1 | 5/2022 | Copty et al. | |
| 2022/0198025 A1 | 6/2022 | Gupta et al. | |
| 2022/0207151 A1 | 6/2022 | Gupta | |
| 2022/0214928 A1 | 7/2022 | Gupta et al. | |
| 2022/0391506 A1 | 12/2022 | Gupta | |
| 2023/0004652 A1 | 1/2023 | Gupta | |

FOREIGN PATENT DOCUMENTS

| | | |
|---|---|---|
| WO | 2020/026228 A1 | 2/2020 |
| WO | 2022/047245 A1 | 3/2022 |
| WO | 2022/147474 A1 | 7/2022 |
| WO | 2022/147478 A1 | 7/2022 |
| WO | 2022/155685 A1 | 7/2022 |
| WO | 2022/155687 A1 | 7/2022 |
| WO | 2022/246436 A1 | 11/2022 |
| WO | 2022/246437 A1 | 11/2022 |
| WO | 2023/133586 A1 | 7/2023 |

OTHER PUBLICATIONS

"Welcome to YARA's documentation-yara 4.3.2 documentation" Available online at: <https://yara.readthedocs.io/en/stable/>, retrieved on Sep. 14, 2023, 4 pages.

"CAPEC—Common Attack Pattern Enumeration and Classification", (CAPEC(Trademark)), Available on https://capec.mitre.org, Jan. 2, 2022, 2 pages.

"CAPEC VIEW: Mechanisms of Attack", View ID: 1000, (Version 3.6), Available online https://capec.mitre.org/data/definitions/1000.html, Jan. 2, 2022, 2 pages.

"Configuration Management Database (CMDB)", 2023, 15 pages.

"CWE VIEW: Software Development" View ID: 699, Individual Dictionary Definition (4.6), Available on https://cwe.mitre.org/data/definitions/699.html, Jan. 2, 2022, 2 pages.

"Integrated Risk Management (IRM)", Gartner Glossary, Available on https://www.gartner.com/en/information-technology/glossary/integrated-risk-management-irm, Jan. 2, 2022, 5 pages.

"Javap—The Java Class File Disassembler", Oracle, Java SE Documentation, Available on https://docs.oracle.com/javase/7/docs/technotes/tools/windows/javap.html, Jan. 2, 2022, 3 pages.

"The Shadow Brokers", Wikipedia, Available on https://en.wikipedia.org/wiki/The_Shadow_Brokers, Jan. 2, 2022, 8 pages.

"Windows Print Spooler Remote Code Execution Vulnerability", Security Vulnerability, CVE-2021-34527, Available on https://msrc.microsoft.com/update-guide/vulnerability/CVE-2021-34527#title, Jun. 13, 2023, 1 page.

Caputo, D., et al: "Droids in Disarray: Detecting Frame Confusion in Hybrid Android Apps", Jun. 11, 2019 (Jun. 11, 2019), Advances in Databases and Information Systems; [Lecture Notes in Computer Science; Lect.Notes Computer], Springer International Publishing, Cham, pp. 121-139.

Chen et al., "Automated system change discovery and management in the cloud", IBM Journal of Research and Development, vol. 60, No. 2-3, Mar. 1, 2016, pp. 2:1-2:10.

Chen et al., "Detecting and Identifying System Changes in the Cloud via Discovery by Example", 2014 IEEE International Conference on Big Data, Oct. 27, 2014, pp. 90-99.

Chen, Lu., et al, "Research on Mobile Application Local Denial of Service Vulnerability Detection Technology Basec on Rule Matching", 2019 IEEE International Conference on Energy Internet (ICEI), IEEE, May 27, 2019 (May 27, 2019), pp. 585-590.

David Stahl, "What's an RFC and what can they do for me?", Global Knowledge, Available on https://www.globalknowledge.com/us-en/resources/resource-library/articles/whats-an-rfc-and-what-can-they-do-for-me/, Sep. 16, 2009, 2 pages.

International Search Report and Written Opinion received for PCT Patent Application No. PCT/US2021/048077, mailed on Dec. 20, 2021, 11 pages.

International Search Report and Written Opinion received for PCT Patent Application No. PCT/US2021/073197, mailed on Mar. 21, 2022, 10 pages.

International Search Report and Written Opinion received for PCT Patent Application No. PCT/US2021/073201, mailed on Apr. 7, 2022, 10 pages.

International Search Report and Written Opinion received for PCT Patent Application No. PCT/US2022/070236, mailed on Apr. 8, 2022, 15 pages.

International Search Report and Written Opinion received for PCT Patent Application No. PCT/US2022/070240, mailed on Apr. 7, 2022, 17 pages.

International Search Report and Written Opinion received for PCT Patent Application No. PCT/US2022/072416, mailed on Sep. 8, 2022, 13 pages.

International Search Report and Written Opinion received for PCT Patent Application No. PCT/US2022/072417, mailed on Sep. 8, 2022, 15 pages.

(56) References Cited

OTHER PUBLICATIONS

Johns, M., et al., "XSSDS: Server-Side Detection of Cross-Site Scripting Attacks", Computer Security Applications Conference, 2008. Acsac, Dec. 8, 2008, pp. 335-344.

Koutroumpouchos, K., et al., "ObjectMap: detecting insecure object deserialization", PCI '19: Proceedings of the 23rd Pan-Hellenic Conference on Informatics, Nov. 28, 2019, pp. 67-72.

Prevelakis et al., "Sandboxing Applications", USENIX, The Advanced Computing Systems Association, Feb. 25, 2019, pp. 1-9.

Secure execution of privileged scripts ED-Darl Kuhn, ip.com, ip.com Inc., West Henrietta, Sep. 18, 2009, XP013134389.

Sun, F., et al., "Client-Side Detection of XSS Worms by Monitoring Payload Propagation", Advances In Databases And Information Systems, Sep. 21, 2009, pp. 539-554.

Xia, M. et al: "Effective Real-Time Android Application Auditing", 2015 IEEE Symposium on Security and Privacy, IEEE, May 17, 2015 (May 17, 2015), pp. 899-914.

Dizdar, A., "Why are SAST solutions not always the best option for AST?", Bright, Jan. 22, 2020, 10 pages.

Horvath, M., et al., "Magic Quadrant for Application Security Testing" Gartner Reprint, (33 pages) Apr. 29, 2020, 33 pages, retrieved from https://www.gartner.com/doc/reprints?id=1-1YWZKUB5&ct=200429&st=sb.

Potdar, S., "The Curious Case of False Positives in Application Security", Security Zone, May 13, 2019, 4 pages.

QwietAI "ShiftLeft Achieves Highest Ever SAST Score on OWASP Benchmark", Nov. 1, 2023, 7 pages, retrieved from https://qwiet.ai/news-press/shiftleft-achieves-highest-ever-sast-score-on-owasp-benchmark/.

International Search Report and Written Opinion received for PCT Patent Application No. PCT/US2023/060379, mailed on Apr. 19, 2023, 15 pages.

Yang Ji, "Efficient and refinable attack investigation," A Dissertation Presented to The Academic Faculty, Georgia Institute of Technology, Dec. 2019, pp. 123.

* cited by examiner

AUTOMATED DETECTION OF CROSS SITE SCRIPTING ATTACKS

RELATED APPLICATION

This application claims the benefit of U.S. Provisional Application No. 63/133,173, filed on Dec. 31, 2020.

The entire teachings of the above application are incorporated herein by reference.

BACKGROUND

With each passing day, cyber-attacks are becoming increasingly sophisticated. Attacks are often targeted to exploit specific vulnerabilities in specific applications. Various methods and tools exist for identifying these vulnerabilities in applications, but these existing methods and tools are inadequate.

SUMMARY

Embodiments provide improved systems, methods, and computer program products to detect cyber-attacks, specifically, cross site scripting attacks.

An example embodiment is directed to a computer implemented method that first, captures a web request and captures a response to the captured web request. According to an embodiment, the web request is captured after being decrypted and decoded. In turn, the method determines if one or more elements associated with the captured web request and one or more elements of the captured response, in combination, cause a malicious action. The method declares a cross site scripting attack in response to determining the one or more elements associated with the captured web request and the one or more elements of the captured response, in combination, cause a malicious action.

According to an embodiment, the one or more elements associated with the captured web request and the one or more elements of the captured response include at least one of a scripting verb and a Document Object Model (DOM).

In an embodiment of the method, wherein the one or more elements associated with the captured web request include a first scripting verb and the one or more elements of the captured response include a second scripting verb. In such an embodiment, if the first scripting verb and the second scripting verb match, the determining identifies the first scripting verb in combination with the second script verb cause a malicious action. As such, a cross site scripting attack is declared. According to an embodiment, if the "first" scripting verb (a verb from the HTTP Request) matches a "second" scripting verb (where the second scripting verb is from the HTTP Response) a Reflective Cross Site Scripting attack is declared. Further, according to another embodiment, if the "first" scripting verb (a verb from the HTTP Request) matches a "second" scripting verb (where the second scripting verb is from a database response) a Stored Cross Site Scripting attack is declared.

The one or more elements associated with the captured web request may include a first DOM element and the one or more elements of the captured response may include a second DOM element. In an embodiment, the determining can identify that the first DOM element in combination with the second DOM element causes a malicious action. When the occurs, the declared cross site scripting attack is a DOM scripting attack.

According to an embodiment, the determining and the declaring are performed by computer programming code implemented in a browser associated with the web request. In such an embodiment, the computer programming code can be in a scripting language, such as JavaScript, VBScripts, SVG, and Active HTML, amongst others.

In an example embodiment, the captured response includes both a database response and a Hypertext Transfer Protocol (HTTP) response. In such an embodiment, the one or more elements associated with the captured web request may include a first scripting verb and the one or more elements of the captured response may include a second scripting verb in the database response and a third scripting verb in the HTTP response. According to such an example embodiment, if the first scripting verb and the third scripting verb match: (i) the determining identifies the first scripting verb in combination with the third scripting verb cause a malicious action and (ii) the declared cross site scripting attack is a reflected cross site scripting attack. Similarly, in such an embodiment, if the first scripting verb and the second scripting verb match: (i) the determining identifies the first scripting verb in combination with the second scripting verb cause a malicious action and (ii) the declared cross site scripting attack is a stored cross site scripting attack. In other words, in such an embodiment, if a scripting verb in the HTTP request matches a scripting verb in the HTTP response, a reflective cross site scripting attack is declared and if a scripting verb in the HTTP request matches a scripting verb in a database response, a stored cross site scripting attack is declared.

Embodiments of the method may also implement a protection action in response to declaring the cross site scripting attack. Example protection actions include (i) executing a user indicated, e.g., provided script, (ii) terminating an Internet Protocol (IP) connection, (iii) terminating a web session, (iv) providing a compensating control to a web application firewall, and/or (v) generating an alert of the cross site scripting attack to a user which is displayed to the user, amongst other examples.

Another embodiment is directed to a computer system for detecting a cross site scripting attack. The system includes a processor and a memory with computer code instructions stored thereon that cause the system to detect cross site scripting attacks as described herein. In one such embodiment, the system is configured to capture a web request and capture a response to the captured web request. In turn, the system determines if one or more elements associated with the captured web request and one or more elements of the captured response, in combination, cause a malicious action. According to an embodiment, the malicious action would occur in an end user's browser. The system is configured to declare a cross site scripting attack in response to determining the one or more elements associated with the captured web request and the one or more elements of the captured response, in combination, cause a malicious action.

Yet another embodiment is directed to a computer program product for detecting cross site scripting attacks. The computer program product comprises one or more non-transitory computer-readable storage devices and program instructions stored on at least one of the one or more storage devices. The program instructions, when loaded and executed by a processor, cause an apparatus associated with the processor to detect cross site scripting attacks as described herein.

In an example embodiment, the program instructions cause an apparatus to capture a web, i.e., HTTP, request and capture a response to the captured web request. The program instructions then cause the apparatus to determine if one or more elements associated with the captured web request and one or more elements of the captured response, in combination, cause a malicious action. Based on the determining, the program instructions cause an apparatus to declare a cross site scripting attack. In particular, a cross site scripting attack is declared in response to determining the one or more elements associated with the captured web request and the one or more elements of the captured response, in combination, cause a malicious action.

It is noted that embodiments of the method, system, and computer program product may be configured to implement any embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows. Embodiments provide improved functionality to detect cross site scripting attacks.

Cross site scripting attacks appear in three main variants: (1) Reflected Cross Site Scripting (RXSS) attacks, (2) Stored Cross Site Scripting (SXSS) attacks, an (3) Document Object Model (DOM) based Scripting (DOMXSS) attacks.

A RXSS attack occurs when an application receives scripting (JavaScript, VBScript, SVG, Active HTML etc.) data in an HTTP request and dispatches that data in the corresponding HTTP response without neutralizing, i.e., making scripting verbs inactive and simply text, the active verbs. The end-user's browser executes the scripting element which causes harm to the end-user. JavaScript actions that can escape the browser's sandbox can cause serious damage to the end user.

A SXSS attack occurs when an application receives scripting (JavaScript, VBScript, SVG, Active HTML etc.) data in an HTTP request and dispatches that data in a later HTTP response, e.g., where the later HTTP response includes a database response, without neutralizing the active verbs. The end-user's browser executes the scripting element which causes harm to the end-user. JavaScript actions that can escape the browser's sandbox can cause serious damage to the end user.

A DOMXSS attack occurs when a JavaScript takes untrusted DOM elements that have been reflected via an HTTP Response and combines it with a user supplied DOM element in the HTTP Request (the browser does not send DOM elements in the HTTP Request line to the server). A DOM element reflected via the HTTP Response can execute malicious code on the end-user's browser.

Some of the challenges faced by existing solutions, like the Web Application Firewall (WAF), is that the user content comes over the wire in encrypted and/or heavily multi-encoded format which makes it difficult for the WAF to detect cross site scripting attacks without dramatically affecting latency. Another issue is that detecting reflection between HTTP Requests and HTTP Responses requires maintaining state. This is a very expensive operation especially when the WAF is being subject to thousands of concurrent sessions.

As such, improved functionality is needed to detect cross site scripting attacks. Embodiments provide such functionality and automatically detect cross site scripting attacks.

Figure 1:
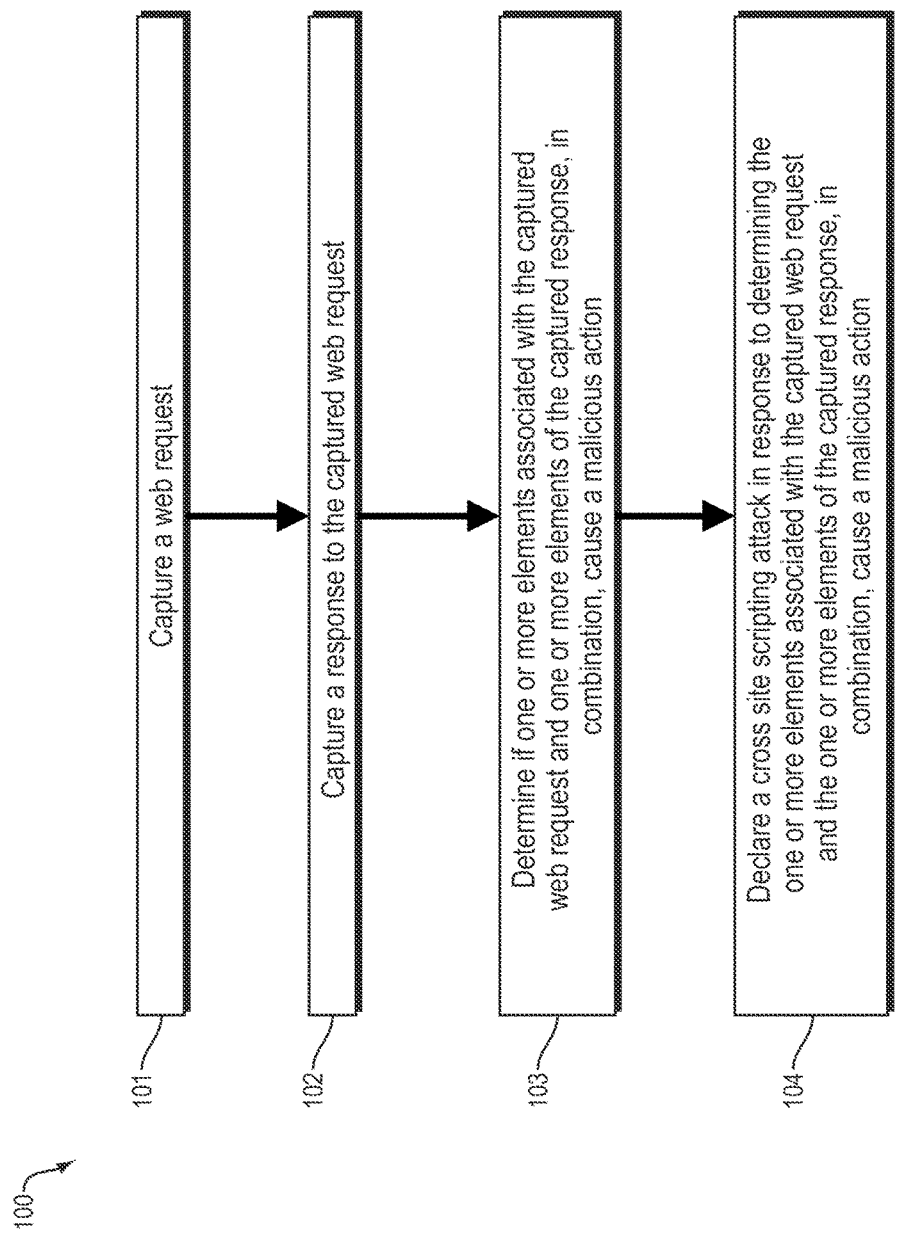
FIG. 1 is a flowchart of a method for detecting a cross site scripting attack according to an embodiment.

FIG. 1 is flow chart of a method 100 for detecting cross site scripting attacks according to an embodiment. The method 100 is computer implemented and, as such, may be implemented using any computing device, or combination of computing devices known in the art. Moreover, the method 100 may be implemented in the system 330 described hereinbelow in relation to FIG. 3.

The method 100 begins at step 101 by capturing a web request. Similarly, at step 102, the method 100 captures a response to the captured web request. According to an embodiment of the method 100, the web request is captured after being decrypted and decoded. In an embodiment, the capturing is done using a framework that implements byte code sensors, e.g., the sensors 223a-d, that are configured to hook, i.e., capture, the web request and response. According to an embodiment, the capturing 101 and 102 is implemented by instrumenting strategic code, such as the HTTP Event pipeline, to detect and intercept traffic at the web server or application server or monitoring specific APIs at the web server or application server. In another embodiment, the capturing is done using a packet capture tool, such as PCAP, Wireshark, or BURP.

To continue, at step 103, the method 100 determines if one or more elements associated with the captured web request and one or more elements of the captured response, in combination, cause a malicious action.

In turn, at step 104, the method 100 declares a cross site scripting attack in response to determining the one or more elements associated with the captured web request and the one or more elements of the captured response, in combination, cause a malicious action.

According to an embodiment of the method 100, the one or more elements associated with the captured (101) web request and the one or more elements of the captured (102) response include at least one of a scripting verb and a Document Object Model (DOM).

In an embodiment of the method 100, the one or more elements associated with the captured web request include a first scripting verb and the one or more elements of the captured response include a second scripting verb. In such an embodiment, if the first scripting verb and the second scripting verb match, the determining identifies the first scripting verb in combination with the second script verb cause a malicious action. As such, a cross site scripting attack is declared. In an embodiment, the first and second scripting verb are the same, i.e., match, because the script passes from the request, through the application, and back to the user's browser. In turn, the script will execute in the user's browser, causing the malicious action.

The one or more elements associated with the captured (101) web request may include a first DOM element and the one or more elements of the captured (102) response may include a second DOM element. In an embodiment, the determining (103) can identify that the first DOM element in combination with the second DOM element causes a malicious action. When the occurs, the declared (104) cross site scripting attack is a DOM scripting attack. In yet another embodiment, the determining (103) and the declaring (104) are performed by computer programming code implemented in a browser associated with the web request. In such an embodiment, the computer programming code can be in a Java format. Such an implementation may be utilized to detect a DOM cross site scripting attack.

In an example embodiment, the captured (102) response includes both a database response and a Hypertext Transfer Protocol (HTTP) response. In such an embodiment, the one or more elements associated with the captured (101) web request may include a first scripting verb and the one or more elements of the captured (102) response may include a second scripting verb in the database response and a third scripting verb in the HTTP response. According to such an example embodiment, if the first scripting verb and the third scripting verb match: (i) the determining (103) identifies the first scripting verb in combination with the third scripting verb cause a malicious action and (ii) the declared (104) cross site scripting attack is a reflected cross site scripting attack. Further, if the first scripting verb and the second scripting verb match: (i) the determining (103) identifies the first scripting verb in combination with the second scripting verb cause a malicious action and (ii) the declared (104) cross site scripting attack is a stored cross site scripting attack.

Embodiments of the method 100 may also implement a protection action in response to declaring (104) the cross site scripting attack. Example protection actions include (i) executing a user indicated script, (ii) terminating an Internet Protocol (IP) connection, (iii) terminating a web session, (iv) providing a compensating control to a web application firewall, and/or (v) displaying an indication of the cross site scripting attack to a user, amongst other examples.

Figure 2:
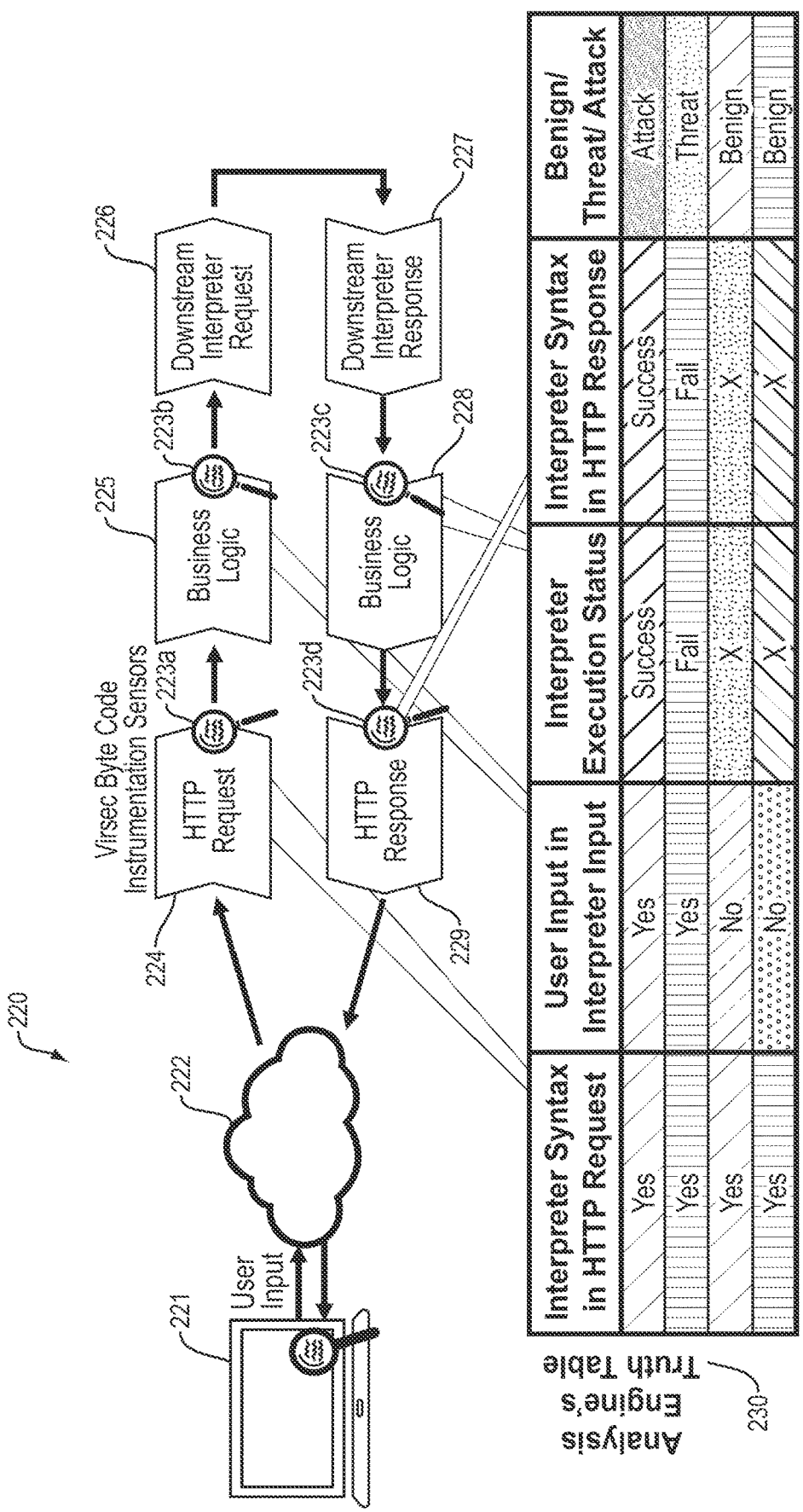
FIG. 2 illustrates functionality of a system used to identify cross site scripting attacks that may be employed in embodiments

FIG. 2 is a diagram illustrating a system 220 and functionality implemented by the system 220 to detect cross site scripting attacks according to an embodiment.

The system 220 processes a user 221 input HTTP request 224 (which is received by the network 222) at a server computing device (not shown) that includes byte code instrumentation sensors 223a-d. The user 221 input HTTP request 224 is processed by the business logic 225 and induces a downstream interpreter request 226. The request 226 induces a downstream interpreter response 227 which is processed by the business logic 228 to create the HTTP response 229 that is sent back to the user 221 via the network 222.

Throughout these steps, the byte code instrumentation sensors 223a-d collect data which is analyzed by an analysis engine, e.g., the engine 331 described hereinbelow in relation to FIG. 3, in accordance with the truth table 230 to determine if there is any malicious action occurring. By operating in accordance with the truth table 230, the system 220 detects cross site scripting attacks.

The functionality of the system 220 provides significantly deeper analysis of web requests, e.g., the HTTP request 224, in comparison to existing tools. For instance, an existing tool may only consider the interpreter syntax in the HTTP request 224 when determining if the request 224 is malicious, but the system 220 goes further and looks to the actual resulting actions, e.g., downstream interpreter request 226, downstream interpreter response 227, and business logic 228 response, induced by the request 224 to determine if there is an attack.

In an example implementation of the system 220, input 224 from the user 221 is instrumented and inspected at the entrance of the HTTP Pipeline application by the sensor 223a. Unlike WAF functionality, the instrumentation in the proposed solution 220 does not have to deal with encryption or encoding issues because the data is picked up just in time for consumption by a web application that is receiving the HTTP input, which means all decrypting and decoding has already been done upstream. Relevant data such as HTTP Session ID, URL, User Info, and Scripting language verbs in user input 224 etc., is appended into a HTTP Context object.

The data returned by the downstream database (an interpreter 226) is also inspected for the presence of scripting verbs that may have been stored by the attacker previously. This is for the purpose of establishing a baseline for stored scripting content. Any scripting verbs are stored in the HTTP Context object.

Finally, the data returned by the end of the HTTP pipeline in the HTTP Response 229 is also inspected for the presence of the same scripting verbs that were found in the two possible inputs (HTTP Request 224 and DB Response 227). If a match is found then a RXSS or SXSS attack is declared. RXSS is declared if the scripting verb was found in the HTTP Request 224 and SXSS attack is declared if scripting elements were found in the database output 227.

One further round of inspection occurs in the user's browser. This is because, if there are DOM elements present in the HTTP request 224 line, these are not transmitted to the server. However, an attacker can reflect DOM elements and cause them to be reflected back to the browser where the DOM object used in the HTTP input 224 can process the DOM element being received via the HTTP Response 229. This can result in the DOM interpreter reacting adversely and performing malicious actions on the user's 221 browser. In an embodiment, this inspection is performed in the user's browser by a JavaScript specially dispatched by the proposed solution 220 into the browser. This JavaScript can perform DOM element sanitizing and declare an attack if dangerous DOM elements arrived via the HTTP Response 229.

Figure 3:
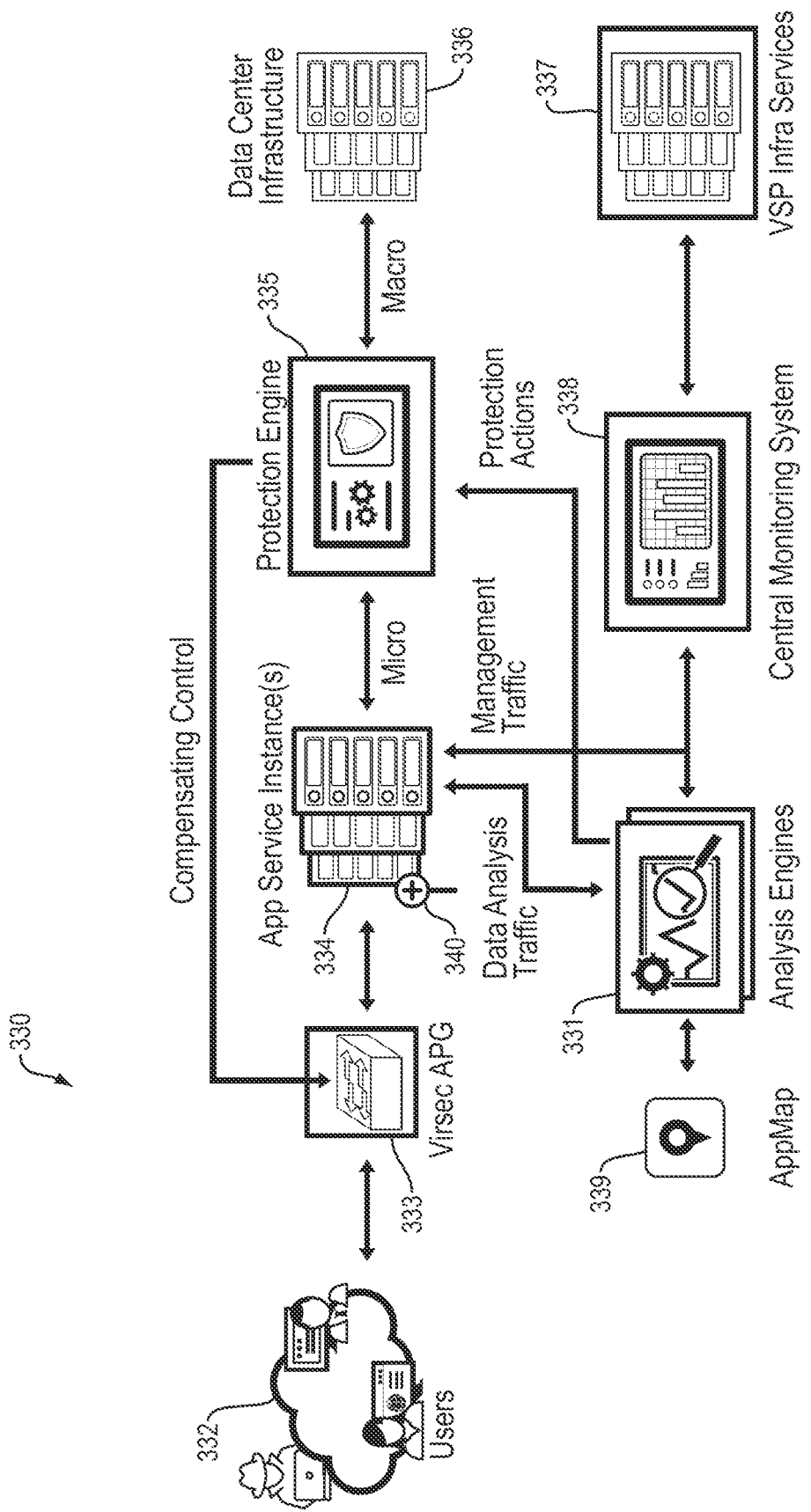
FIG. 3 illustrates an example system for detecting cross site scripting attacks according to an embodiment.

FIG. 3 is a simplified diagram of a system 330 that is used to detect cross site scripting attacks according to an embodiment.

In the system 330, new code and upgrades for VSP code are delivered into the VSP Infra Service (337).

Users (some good, some bad) 332 send HTTP or web requests to the one or more clusters of application server(s) 334. These HTTP or web requests can be inspected by a WAF 333 which may or may not be able to decode the contents since these HTTP or web requests may be encrypted or encoded.

However, in the system 330, the instrumentation 340 in the servers 334, extracts the data (as described in relation to FIG. 2 above) and sends the extracted data to the analysis engine 331. In the system 330, the analysis engine 331 can implement the functionality described herein, e.g., operate in accordance with the truth table 230. In an embodiment, the AppMap 339 contains data for all Interpreter verbs in all coding languages including JavaScript. As such, when run time data instrumentation reaches the analysis engine 331, it can make an exact match. If the analysis engine 331 determines there is an attack in progress, the analysis engine 331 sends a message to the protection engine 335. The protection engine 335 can either perform active inline protection on servers 334 or passive protection on other data center infrastructure (like IPS, Router etc.) shown in 336. The analysis engine 331 can update the attack status to the Central Monitoring System (CMS) (338).

The analysis by the system 330 also pushes forensic details about the attack such as URL, User, Web Session, offending script details etc. into the Central Monitoring System 338 for display in a dashboard.

In all the three cases, RXSS, SXSS, and DOMXSS, the Analysis Engine 331 triggers one or more desired protection actions. In an embodiment, protection actions are implemented by firing a user chosen/provided script that can execute any of several protection actions. Example protection actions include terminating the IP connection or terminating the web session. One protection action may also include firing a Compensating Control into a Web Application firewall. This allows the WAF to know the details of which parameter in which URL is subject to an XSS vulnerability.

Embodiments have numerous benefits compared to existing solutions. For instance, unlike WAF solutions, embodiments do not suffer from having to perform decryption and encryption upstream of the application. This prevents latency in the HTTP pipeline and avoids large processing overheads. Embodiments can also maintain state between the two types of inputs (from HTTP Request as well as DBB Response) on the one hand and the HTTP Response on the other hand. Unlike WAF, embodiments can dispatch a JavaScript into user browsers. This allows embodiments to detect and block DOM XSS.

Further, since the WAF does not save state and declares an attack based on scripting input being present in the HTTP input, there is a possibility that this is a false negative. The application's business logic could have neutralized scripting input and, therefore, there was no need to have raised an alert and thereby create work on a forensic analyst. The scripting verbs may have been present in some text box in which case it would not have caused harm. A WAF would not be in a position to know the details of how the application handles user input and therefore may trip a wholly not required alert in this case. Embodiments do not suffer from this problem.

Below, Table 1 summarizes benefits of embodiments compared to existing methods:

TABLE 1

| | | WAF | RASP | Embodiments |
|---|---|---|---|---|
| Practical | Out-Of-The Box-Protection | Requires extensive learning, tuning, adjusting | Limited protection without integration and tuning | Full protection without learning or tuning |
| | Code Impact | No code impact | Code changes and integration for advanced functionality | No code modification required |
| | Performance Under Load | Heavy loads force fail-open mode | Increases transaction latency substantially | High performance minimal latency impact |
| Effective | App Surface Coverage | Limited breadth and depth | More depth with customization | Full stack coverage |
| | File System Monitoring | Not supported | Not supported | Fully integrated |
| | Malware Protection | Not supported | Not supported | Full protection from file based, fileless, and WRT |
| Accurate | Context Awareness | Stateless: Limited context based only on HTTP analysis | Stateless: More context with extensive integration and tuning | Stateful: Full context awareness |
| | High accuracy, low false positives | Low fidelity, high false positives | Limited fidelity, high false positives | Deterministic, eliminate false positives |
| | Protection Actions | Basic protection actions | Limited protection actions | Extensive, flexible protection. |

Figure 4:
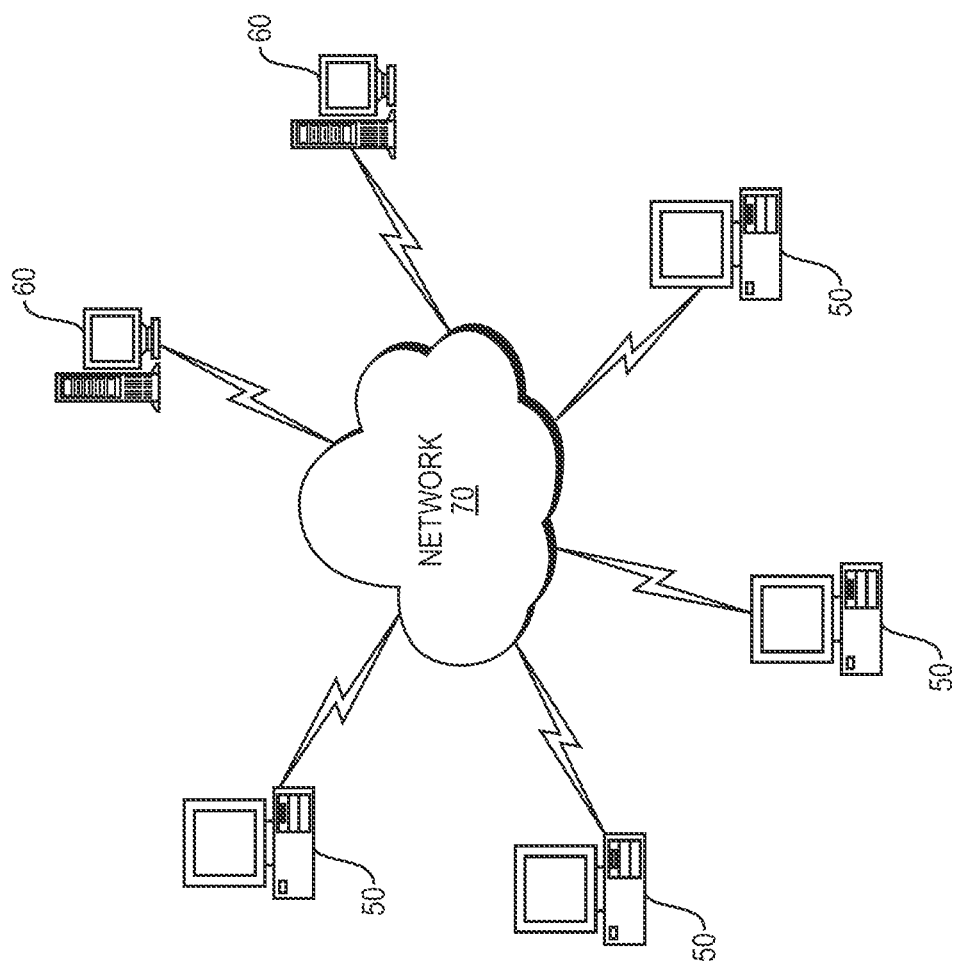
FIG. 4 depicts a computer network or similar digital processing environment in which embodiments may be implemented.

FIG. 4 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 and/or servers 60 may be configured, alone or in combination, to implement the embodiments described herein, e.g., the method 100, amongst other examples. The server computers 60 may not be separate server computers but part of cloud network 70.

Figure 5:
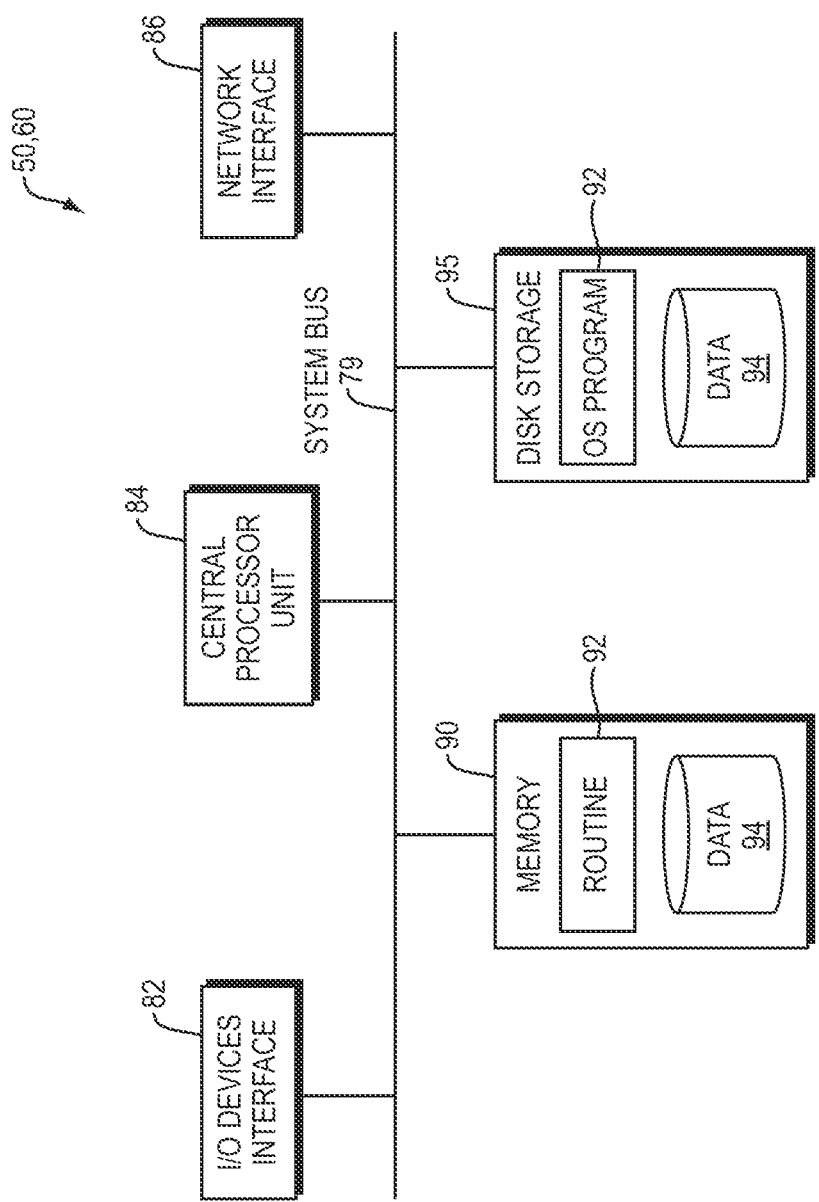
FIG. 5 is a diagram illustrating an example internal structure of a computer in the environment of FIG. 4.

FIG. 5 is a diagram of an example internal structure of a computer (e.g., client processor/device 50 or server computers 60) in the computer system of FIG. 4. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an input/output (I/O) device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 5). Memory 90 provides volatile storage for computer software instructions 92 and data 94 used to implement an embodiment of the present disclosure (e.g., the method 100, amongst others). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method of detecting a cross site scripting attack, the method comprising:
   capturing a web request provided by a user, after the web request is decrypted and decoded, by capturing the web request at an entrance to a Hypertext Transfer Protocol (HTTP) pipeline;
   capturing a response to the captured web request;
   determining if one or more elements associated with the captured web request and one or more elements of the captured response, in combination, cause a malicious action, wherein the determining is based on (i) presence of interpreter syntax in user input, provided by the user, in the captured web request, and at least one of (ii) status of the user input being included in interpreter input, (iii) execution status of the interpreter, and (iv) presence of interpreter syntax in the captured response; and
   declaring a cross site scripting attack in response to determining the one or more elements associated with the captured web request and the one or more elements of the captured response, in combination, cause a malicious action.

2. The method of claim 1 wherein the one or more elements associated with the captured web request and the one or more elements of the captured response include at least one of:
   a scripting verb; and
   a Document Object Model (DOM).

3. The method of claim 1 wherein the one or more elements associated with the captured web request include a first scripting verb and the one or more elements of the captured response include a second scripting verb and where, if the first scripting verb and the second scripting verb match, the determining identifies the first scripting verb in combination with the second script verb cause a malicious action.

4. The method of claim 1 wherein the one or more elements associated with the captured web request include a first Document Object Model (DOM) element and the one or more elements of the captured response include a second DOM element.

5. The method of claim 4 wherein:
   the determining identifies the first DOM element in combination with the second DOM element cause a malicious action; and
   the declared cross site scripting attack is a DOM scripting attack.

6. The method of claim 1 wherein the determining and the declaring are performed by computer programming code implemented in a browser associated with the web request.

7. The method of claim 6 wherein the computer programming code is in a scripting language.

8. The method of claim 1 wherein the captured response includes both a database response and a HTTP response.

9. The method of claim 8 wherein the one or more elements associated with the captured web request include a first scripting verb and the one or more elements of the captured response include a second scripting verb in the database response and a third scripting verb in the HTTP response.

10. The method of claim 9 wherein:
    if the first scripting verb and the third scripting verb match: (i) the determining identifies the first scripting verb in combination with the third scripting verb cause a malicious action and (ii) the declared cross site scripting attack is a reflected cross site scripting attack; and
    if the first scripting verb and the second scripting verb match: (i) the determining identifies the first scripting verb in combination with the second scripting verb cause a malicious action and (ii) the declared cross site scripting attack is a stored cross site scripting attack.

11. The method of claim 1 further comprising:
    in response to declaring the cross site scripting attack, implementing a protection action.

12. The method of claim 11 wherein the protection action is at least one of:
    executing a user indicated script;
    terminating an Internet Protocol (IP) connection;
    terminating a web session;

providing a compensating control to a web application firewall; and displaying an indication of the cross site scripting attack to a user.

13. A system for detecting a cross site scripting attack, the system comprising:

a processor; and a memory with computer code instructions stored thereon, the processor and the memory, with the computer code instructions, being configured to cause the system to:

capture a web request provided by a user, after the web request is decrypted and decoded, by capturing the web request at an entrance to a Hypertext Transfer Protocol (HTTP) pipeline;

capture a response to the captured web request;

determine if one or more elements associated with the captured web request and one or more elements of the captured response, in combination, cause a malicious action, wherein the determining is based on (i) presence of interpreter syntax in user input, provided by the user, in the captured web request, and at least one of (ii) status of the user input being included in interpreter input, (iii) execution status of the interpreter, and (iv) presence of interpreter syntax in the captured response; and declare a cross site scripting attack in response to determining the one or more elements associated with the captured web request and the one or more elements of the captured response, in combination, cause a malicious action.

14. The system of claim 13 wherein the one or more elements associated with the captured web request and the one or more elements of the captured response include at least one of:

a scripting verb; and a Document Object Model (DOM).

15. The system of claim 13 wherein the one or more elements associated with the captured web request include a first Document Object Model (DOM) element and the one or more elements of the captured response include a second DOM element.

16. The system of claim 15 wherein:

the determining identifies the first DOM element in combination with the second DOM element cause a malicious action; and the declared cross site scripting attack is a DOM scripting attack.

17. The system of claim 13 wherein (i) the captured response includes both a database response and a HTTP response and (ii) the one or more elements associated with the captured web request include a first scripting verb and the one or more elements of the captured response include a second scripting verb in the database response and a third scripting verb in the HTTP response, and where:

if the first scripting verb and the third scripting verb match: (i) the determining identifies the first scripting verb in combination with the third scripting verb cause a malicious action and (ii) the declared cross site scripting attack is a reflected cross site scripting attack; and if the first scripting verb and the second scripting verb match: (i) the determining identifies the first scripting verb in combination with the second scripting verb cause a malicious action and (ii) the declared cross site scripting attack is a stored cross site scripting attack.

18. The system of claim 13 wherein the processor and the memory, with the computer code instructions, are further configured to cause the system to:

in response to declaring the cross site scripting attack, implement a protection action.

19. A computer program product for detecting a cross site scripting attack, the computer program product comprising:

one or more non-transitory computer read-able storage devices and program instructions stored on at least one of the one or more storage devices, the program instructions, when loaded and executed by a processor, cause an apparatus associated with the processor to:

capture a web request provided by a user, after the web request is decrypted and decoded, by capturing the web request at an entrance to a Hypertext Transfer Protocol (HTTP) pipeline;

capture a response to the captured web request;

determine if one or more elements associated with the captured web request and one or more elements of the captured response, in combination, cause a malicious action, wherein the determining is based on (i) presence of interpreter syntax in user input, provided by the user, in the captured web request, and at least one of (ii) status of the user input being included in interpreter input, (iii) execution status of the interpreter, and (iv) presence of interpreter syntax in the captured response; and declare a cross site scripting attack in response to determining the one or more elements associated with the captured web request and the one or more elements of the captured response, in combination, cause a malicious action.

* * * * *